United States Patent
Han et al.

(10) Patent No.: US 9,011,047 B2
(45) Date of Patent: Apr. 21, 2015

(54) SUPPORTING STRUCTURE FOR OFFSHORE WIND POWER GENERATOR

(71) Applicant: Korea Institute of Ocean Science and Technology, Ansan (KR)

(72) Inventors: Taek Hee Han, Seoul (KR); Woo Sun Park, Seoul (KR); Deok Hee Won, Seoul (KR)

(73) Assignee: Korea Institute of Ocean Science and Technology, Ansan (KR)

( * ) Notice: Subject to any disclaimer, the term of this patent is extended or adjusted under 35 U.S.C. 154(b) by 0 days.

(21) Appl. No.: 14/028,745

(22) Filed: Sep. 17, 2013

(65) Prior Publication Data
US 2014/0079490 A1  Mar. 20, 2014

(30) Foreign Application Priority Data

Sep. 20, 2012 (KR) .................. 10-2012-0104697

(51) Int. Cl.
*E02B 17/02* (2006.01)
*F03D 11/04* (2006.01)
*E02B 17/00* (2006.01)

(52) U.S. Cl.
CPC ............ *E02B 17/025* (2013.01); *Y02E 10/727* (2013.01); *E02B 2017/0091* (2013.01); *F03D 11/045* (2013.01); *F05B 2240/95* (2013.01)

(58) Field of Classification Search
CPC .......... E02B 17/025; E02B 2017/0091; F03D 11/045; F05B 2240/95; Y02E 10/727
USPC ........................................ 405/224, 225, 228
See application file for complete search history.

(56) References Cited

U.S. PATENT DOCUMENTS

| | | | | |
|---|---|---|---|---|
| 3,488,967 | A * | 1/1970 | Toossi | 405/210 |
| 4,012,917 | A * | 3/1977 | Gendron | 405/199 |
| 4,684,293 | A * | 8/1987 | Takafuji | 405/224 |
| 4,695,197 | A * | 9/1987 | Watt et al. | 405/224 |
| 6,575,665 | B2 * | 6/2003 | Richter et al. | 405/195.1 |
| 8,444,348 | B2 * | 5/2013 | Nottingham et al. | 405/227 |
| 8,720,139 | B2 * | 5/2014 | Henderson | 52/295 |
| 2005/0286979 | A1 * | 12/2005 | Watchorn | 405/224 |
| 2007/0269273 | A1 * | 11/2007 | Henderson | 405/239 |
| 2009/0304453 | A1 * | 12/2009 | Hardison | 405/224 |
| 2010/0150665 | A1 * | 6/2010 | Karal | 405/232 |
| 2011/0061332 | A1 * | 3/2011 | Hettick | 52/651.07 |
| 2011/0188945 | A1 * | 8/2011 | Hartkopf | 405/224 |
| 2011/0314750 | A1 * | 12/2011 | Nies | 52/173.1 |

(Continued)

FOREIGN PATENT DOCUMENTS

KR   101123257 B1   3/2012

*Primary Examiner* — Benjamin Fiorello
(74) *Attorney, Agent, or Firm* — Maxon IP, LLC; Justin H. Kim

(57) ABSTRACT

Disclosed herein is supporting structure for an offshore wind power generator. The supporting structure includes lower support part and main body part. The lower support part includes lower concrete part which is provided on a base installed on the sea floor and is reduced in width from the bottom thereto to the top, at least one lower hollow space which is formed in the lower concrete part, and a lower inner-pipe which is attached to the inner surface of the lower hollow space. The main body part is coupled to an upper end of the lower support part. The main body part includes a main-body concrete part, at least one main-body hollow space which is formed in the main-body concrete part and communicates with the lower hollow space, and a main-body inner-pipe which is attached to a circumferential inner surface of the main-body hollow space.

8 Claims, 11 Drawing Sheets

(56) References Cited

U.S. PATENT DOCUMENTS

| | | | |
|---|---|---|---|
| 2012/0023860 A1* | 2/2012 | Voss | 52/651.09 |
| 2012/0047830 A1* | 3/2012 | Phuly | 52/294 |
| 2012/0257973 A1* | 10/2012 | Rebsdorf et al. | 416/146 R |
| 2013/0233231 A1* | 9/2013 | Dagher et al. | 114/265 |
| 2014/0044554 A1* | 2/2014 | Lafferty | 416/244 R |
| 2014/0056650 A1* | 2/2014 | Reinhall et al. | 405/232 |
| 2014/0248090 A1* | 9/2014 | Fernandez Gomez et al. | 405/196 |

* cited by examiner

FIG. 5A
FIG. 5B
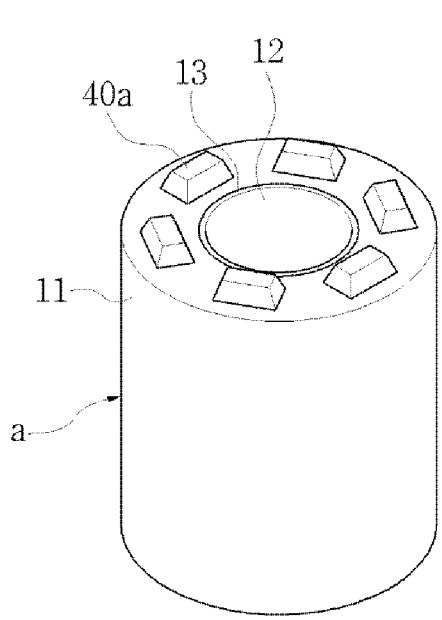
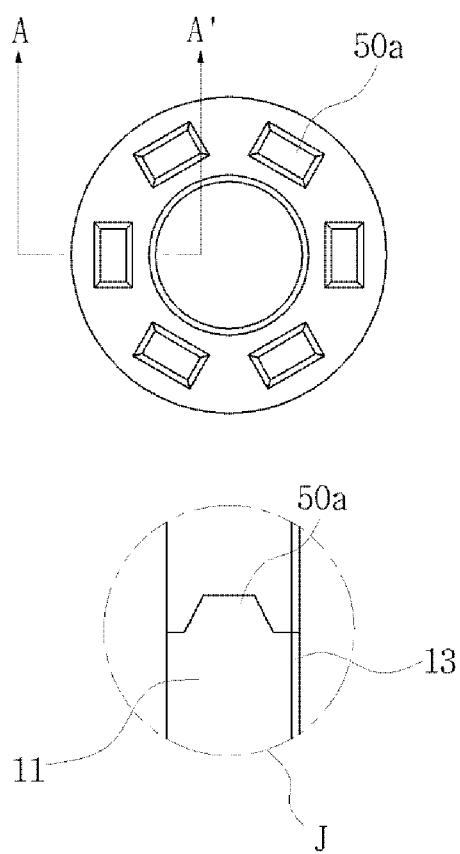
FIG. 5C

FIG. 6A
FIG. 6B
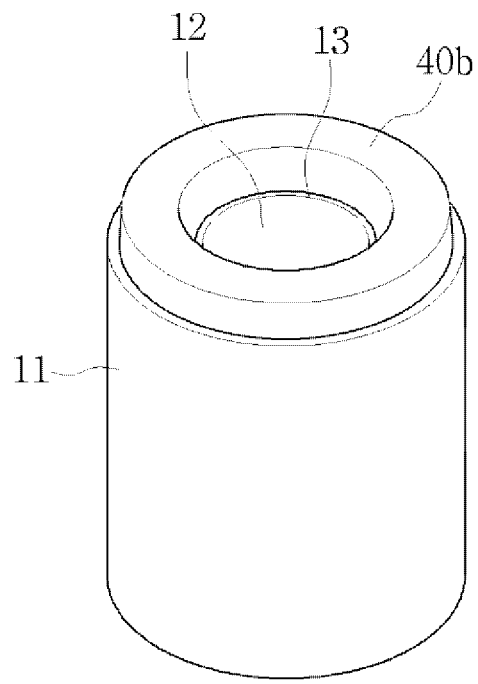
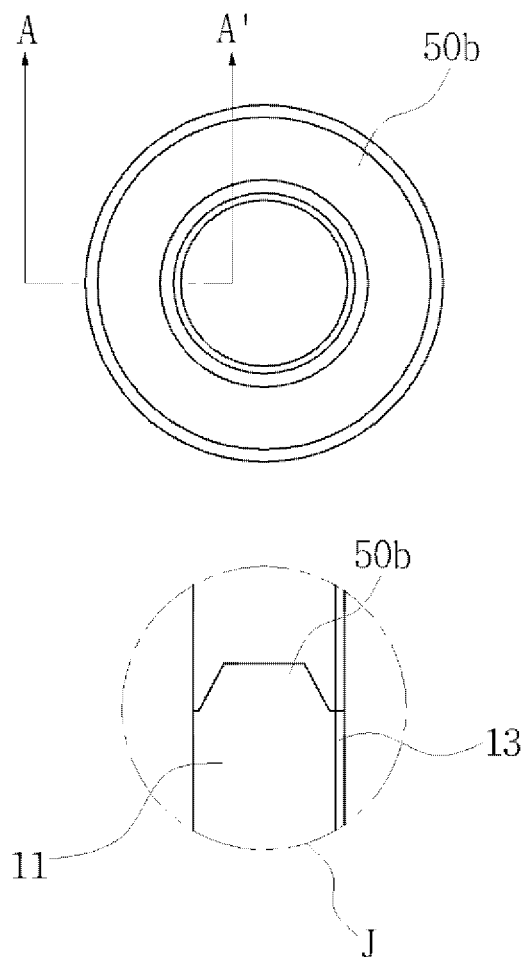
FIG. 6C

FIG. 7A
FIG. 7B
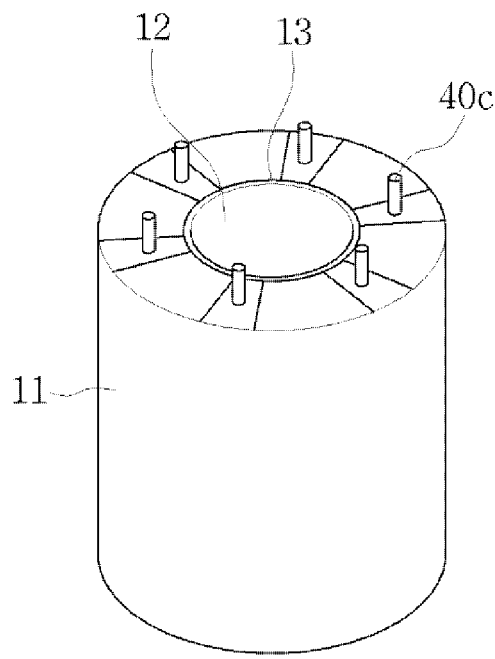
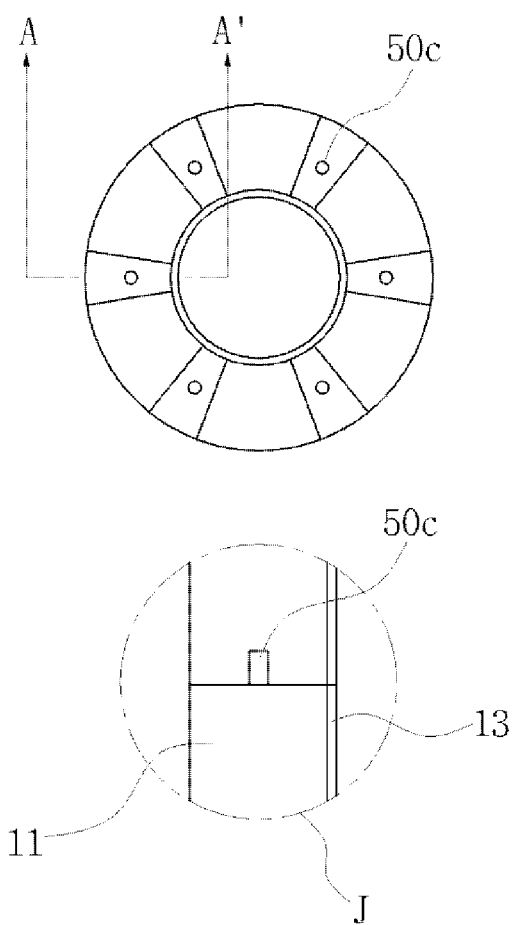
FIG. 7C

FIG. 9A
FIG. 9B
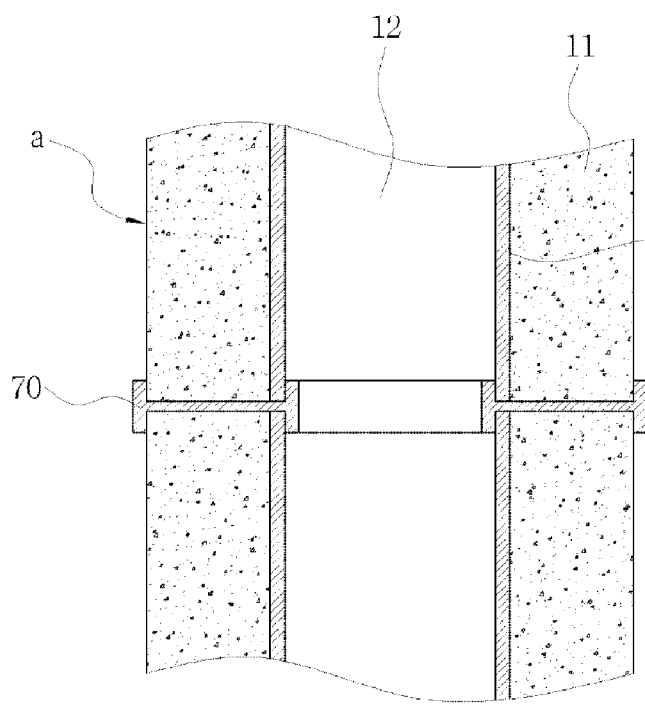
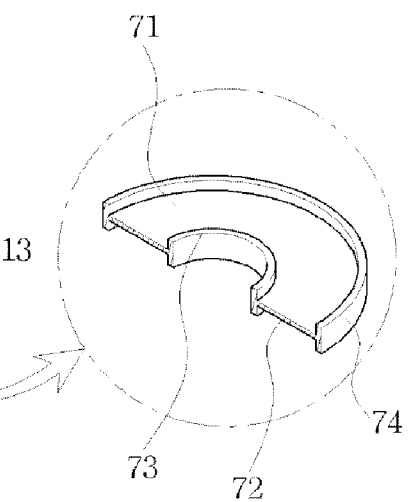

SUPPORTING STRUCTURE FOR OFFSHORE WIND POWER GENERATOR

This application claims foreign priority of Korean Patent Application No. 10-2012-0104697, filed on Sep. 20, 2012 which is incorporated by reference in its entirety into this application.

BACKGROUND OF THE INVENTION

1. Field of the Invention

The present invention relates generally to supporting structures for offshore wind power generators and, more particularly, to a supporting structure for offshore wind power generators which includes a lower support part, a main body part and an upper support part, each of which has a concrete part, a hollow space formed in the concrete part, and an inner pipe that defines the hollow space, wherein the inner pipe can improve the rigidity and ductility of each part, thus enhancing resistance to transverse loads at sea, and the hollow space of each part can reduce the weight thereof, and the parts of the supporting structure can be modularized so that the supporting structure can be constructed by assembling the parts, whereby there are advantages in terms of material and construction.

2. Description of the Related Art

At present, in Korea, there are no design criteria on development of a supporting structure for offshore wind power generators. In the case of advanced countries in Europe, the design criteria for wind power generators have been established. However, advanced countries do not open source core technology, making a technological gap between the advanced countries and other countries.

In the case of design criteria used in a design for civil engineering and construction structures, the systematic load of a wind power generator cannot be directly applied to these design criteria, so it is impossible to obtain international certification. Further, in Korea, conservative and uneconomical design methods have been used, resulting in reduced price competitiveness, and making advance into the overseas markets difficult. Therefore, related technical development is urgently required.

For this, an example of a supporting structure for offshore wind power generators was proposed in Korean Patent Registration No. 1123257. The conventional support structure includes: a base plate 100 which is installed on the sea floor; a cylindrical main body 200 which is installed on an upper surface of the base plate 100; and a plurality of supports 300 which are installed diagonally in such a way that lower ends thereof are hinged to the upper surface of the base plate 100 and upper ends thereof are hinged to a sidewall of the main body 200. The base plate 100 and the main body 200 are made of concrete. As wind power towers and impellers have become larger, such supporting structures for supporting the towers and impellers have also become larger. Given this, if the main body is formed of concrete, the volume of the main body must be comparatively large. However, as such, if the volume of the supporting structure is large, the construction thereof cannot be facilitated, and excessive use of cement causes a problem of not being environment-friendly.

PRIOR ART DOCUMENT

Patent Document (Patent document 0001) Korean Patent Registration No. 1123257

SUMMARY OF THE INVENTION

Accordingly, the present invention has been made keeping in mind the above problems occurring in the prior art, and an object of the present invention is to provide a supporting structure for offshore wind power generators which is configured such that when the supporting structure for a large offshore wind power generator tower or the like is constructed, by virtue of a reduced weight, the construction of the supporting structure can be facilitated and cost efficiency can be enhanced, and which has superior rigidity and ductility so that resistance to a transverse load such as a wave load, a load resulting from sea current, etc. can be improved.

In order to accomplish the above object, the present invention provides a supporting structure for an offshore wind power generator, including: a lower support part having a lower concrete part provided on a base installed on a sea floor, the lower concrete part being reduced in width from a bottom thereto to a top, at least one lower hollow space formed in the lower concrete part, and a lower inner-pipe attached to a circumferential inner surface of the lower hollow space, the lower inner-pipe being made of steel or FRP (fiber reinforced plastic); and a main body part coupled to an upper end of the lower support part, the main body part having a main-body concrete part; at least one main-body hollow space formed in the main-body concrete part, the main-body hollow space communicating with the lower hollow space, and a main-body inner-pipe attached to a circumferential inner surface of the main-body hollow space, the main-body inner-pipe being made of steel or FRP.

As such, because the hollow space is formed in the supporting structure, its own weight can be reduced. Further, the concrete part is supported by the inner pipe so that resistance to a transverse load such as a wave load, a wind load, an earthquake load, etc., can be enhanced.

The supporting structure may further include an upper support part having: an upper concrete part provided on an upper end of the main body part, the upper concrete part being increased in width from the bottom thereto to the top; at least one upper hollow space formed in the upper concrete part, the upper hollow space communicating with the main-body hollow space; and an upper inner-pipe attached to a circumferential inner surface of the upper hollow space, the upper inner-pipe being made of steel or FRP. A tower can be installed on an upper end of the upper support part.

As stated above, in the present invention, the concrete parts are respectively provided in the lower support part, the main body part and the upper support part, wherein the hollow space is formed in the inner portion of each concrete part that has low contribution to resistance to bending, whereby the amount of material and the weight can be reduced. The hollow shape is defined by the inner pipe so that the concrete part is supported, thus enhancing the rigidity and ductility of the structure. Moreover, recently, as wind power generator towers become larger, a supporting structure for offshore wind power towers which can resist bending movements or a transverse loads is required. To resist bending, the supporting structure has a cross-section capable of reducing its own weight in such a way that a hollow space is formed in the supporting structure, and reinforcing bars and the inner pipe are provided in the concrete part to prevent the ductility from deteriorating because of the formation of the hollow space, thus preventing brittle fracture. Furthermore, by virtue of this structure, partial buckling can be presented, and resistance to a transverse load such as a wave load, a wind load, an earthquake load, etc. can be enhanced.

Meanwhile, the main body part may comprise a plurality of units assembled with each other with respect to a vertical direction. A shear key and a shear key depression may be respectively provided in upper and lower ends of the main-body concrete part of each of the units so that the adjacent upper and lower units can be assembled with each other. To enhance structural strength of the junction between the units, a support having a planar shape may be attached to a circumferential outer surface of a junction between the adjacent upper and lower units so that the upper and lower units can be assembled with each other, or a connector having an H-shaped cross-section may be provided in a junction between the adjacent upper and lower units so that the adjacent upper and lower units can be assembled with each other. In other words, the supporting structure for offshore wind power generators according to the present invention may be configured to have an integrated body or, alternatively, may be configured in such a way that a plurality of units are separably assembled with each other with respect to the vertical direction. In the case where the supporting structure is configured in such a way that a plurality of units are assembled with each other, each unit can be produced by pre-casting, and the units are assembled with each other in a site.

BRIEF DESCRIPTION OF THE DRAWINGS

The above and other objects, features and advantages of the present invention will be ore clearly understood from the following detailed description taken in conjunction with the accompanying drawings, in which:

FIGS. 5A through 5C are a perspective view illustrating an embodiment of a shear key and a shear key depression of modularized units of the main body part of the supporting structure according to the present invention;

FIGS. 6A through 6C are a perspective view illustrating an embodiment of a shear key and a shear key depression of modularized units of the main body part of the supporting structure according to the present invention;

FIGS. 7A through 7C are a perspective view illustrating an embodiment of a shear key and a shear key depression of modularized units of the main body part of the supporting structure according to the present invention;

FIGS. 9A and 9B are a side sectional view illustrating an embodiment of an assembly means of the junction between the modularized units of the main body part according to the present invention.

DESCRIPTION OF THE PREFERRED EMBODIMENTS

Hereinafter, preferred embodiments of the present invention will be described in detail with reference to FIGS. 1 through 10.

Figure 1:
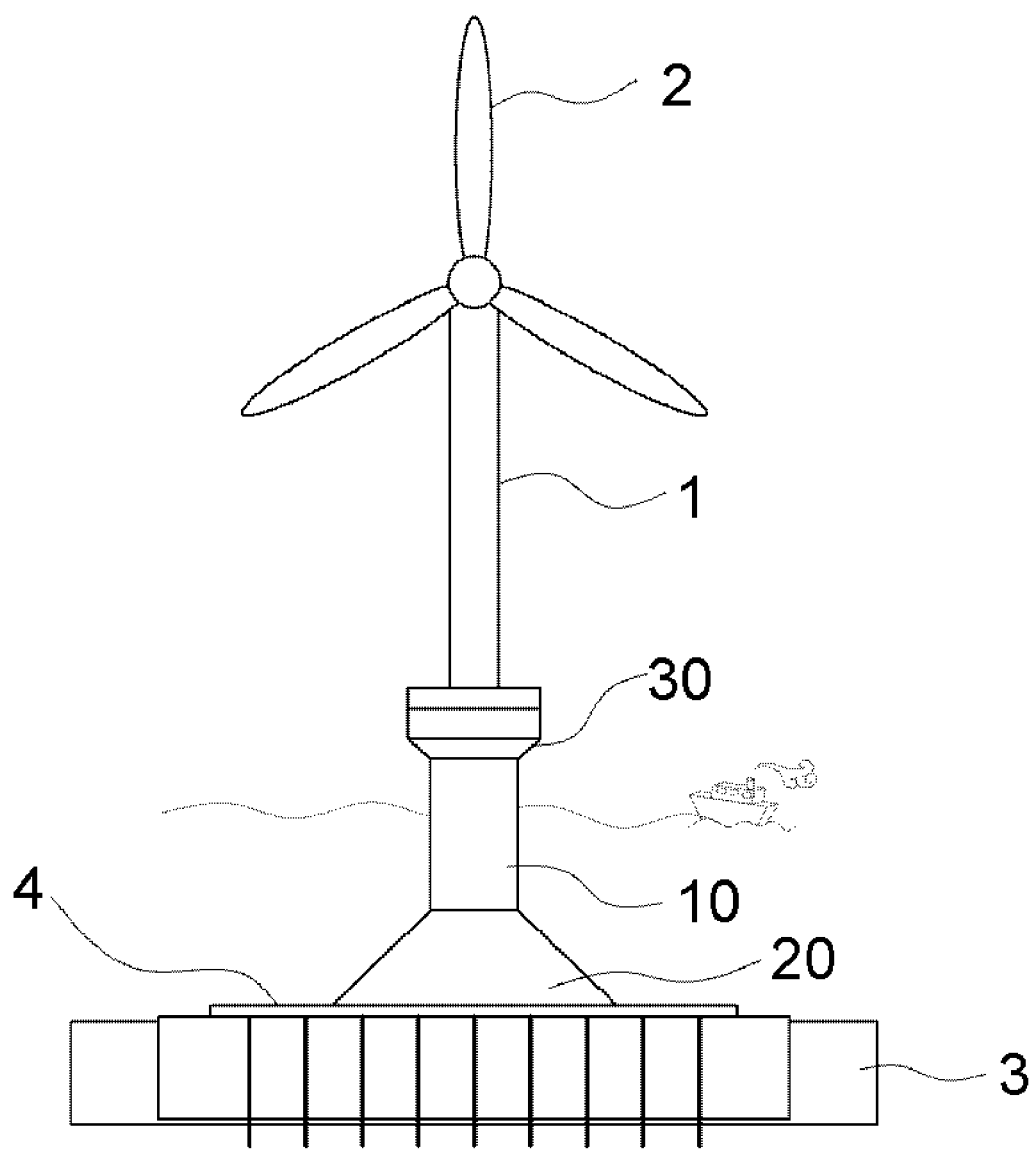
FIG. 1 is a schematic view illustrating a supporting structure for an offshore wind power generator installed on the sea floor according the present invention.
Figure 2:
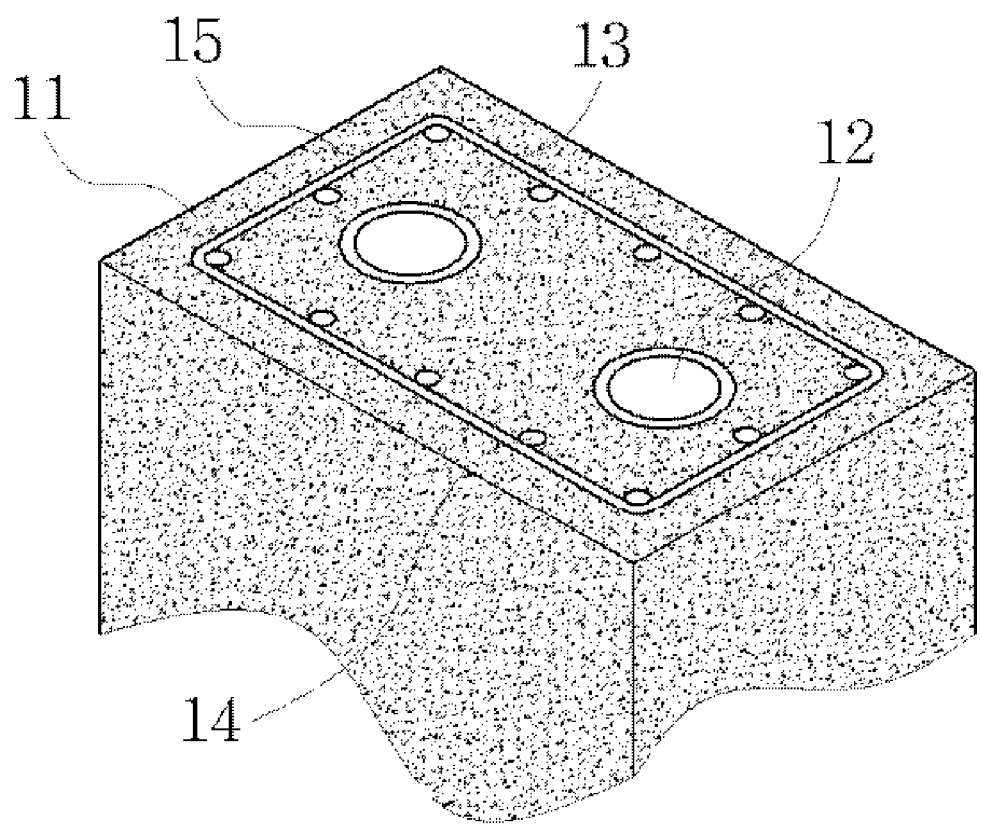
FIG. 2 is a perspective view illustrating a main body part of the supporting structure according to the present invention.
Figures 3A, 3B:
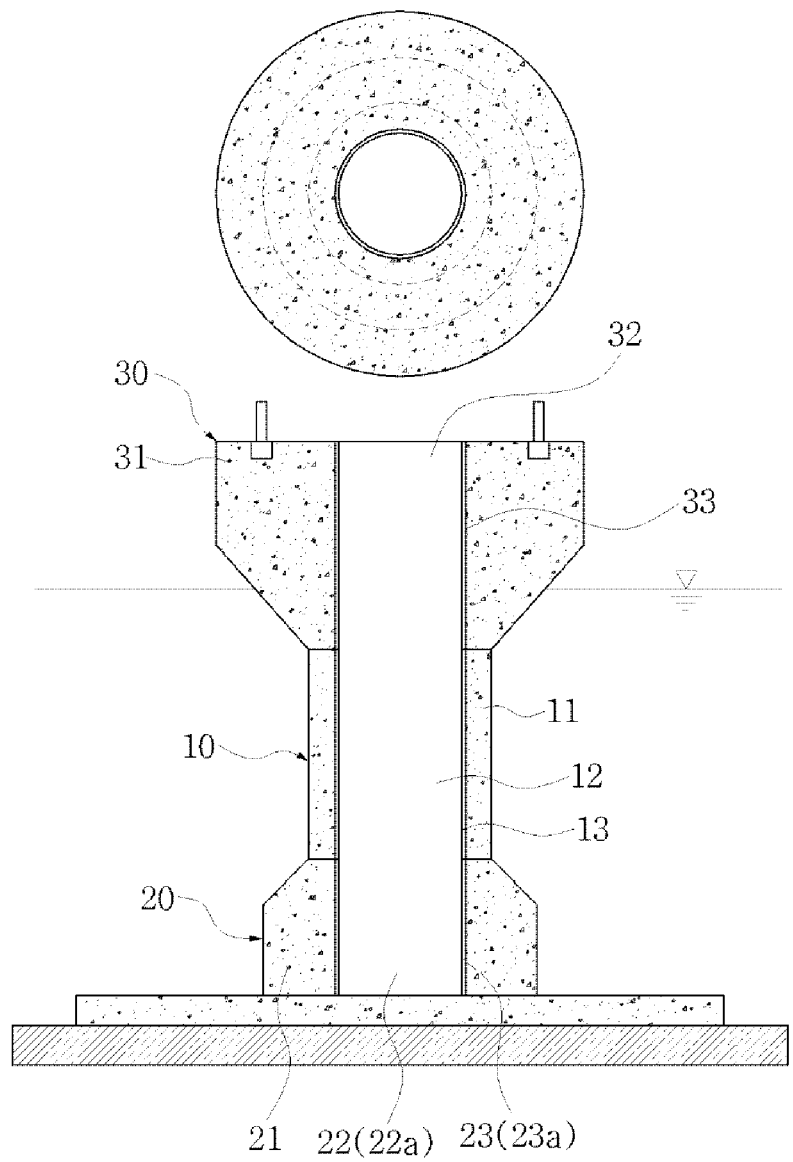
FIGS. 3A and 3B are a side sectional view showing an embodiment of a lower support part of the supporting structure according to the present invention.
Figures 4A, 4B:
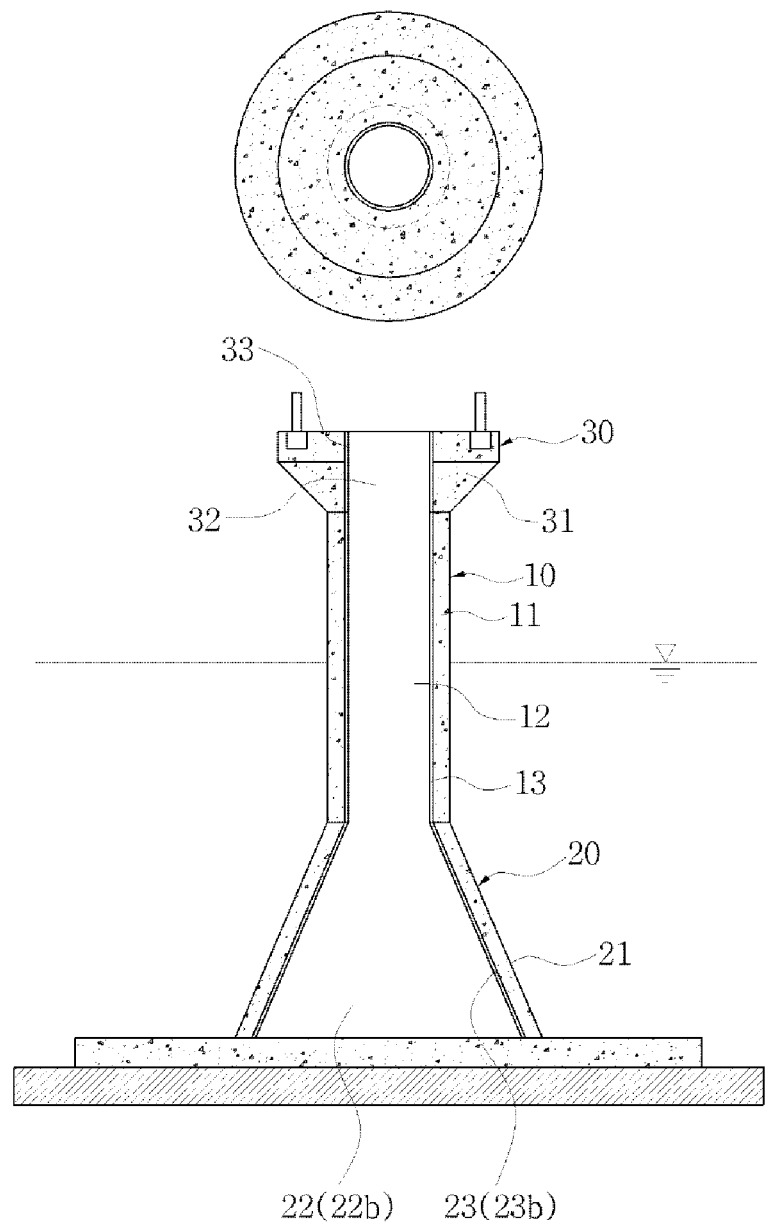
FIGS. 4A and 4B are a side sectional view showing an embodiment of a lower support part of the supporting structure according to the present invention.
Figure 4C:
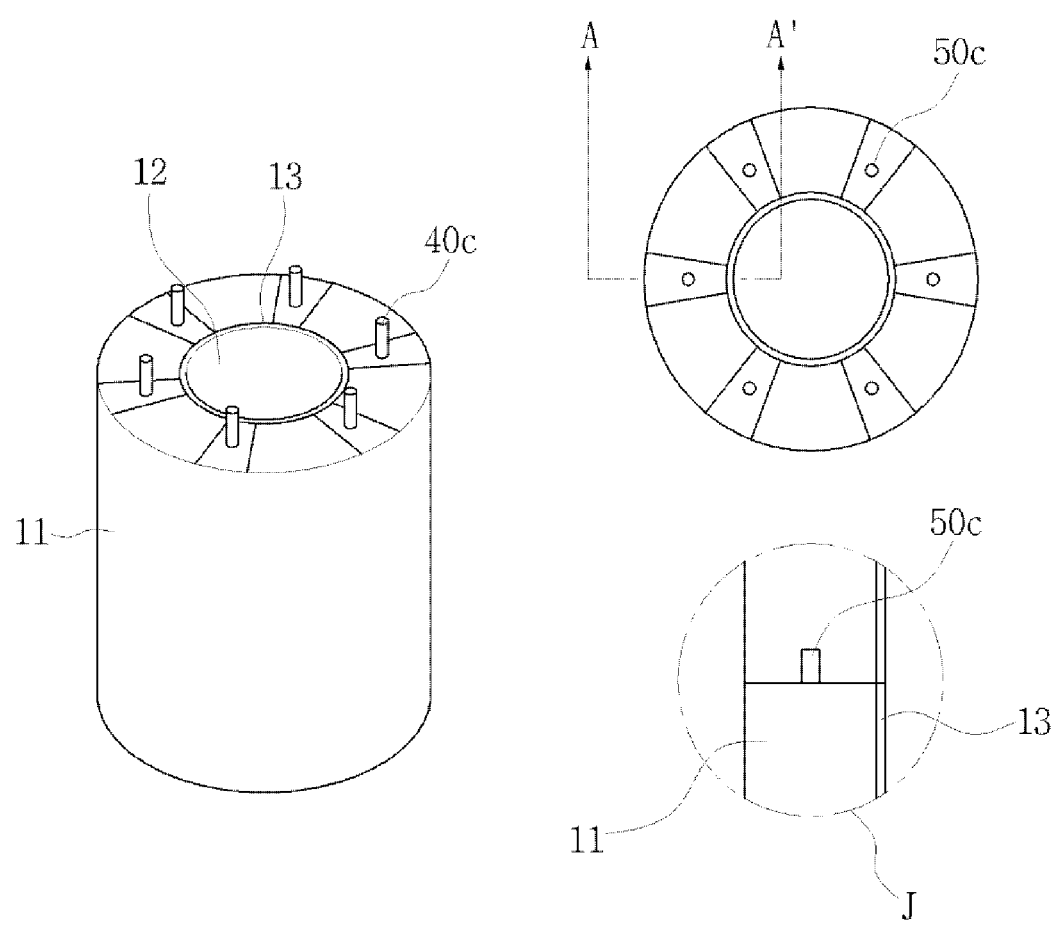
Figure 8:
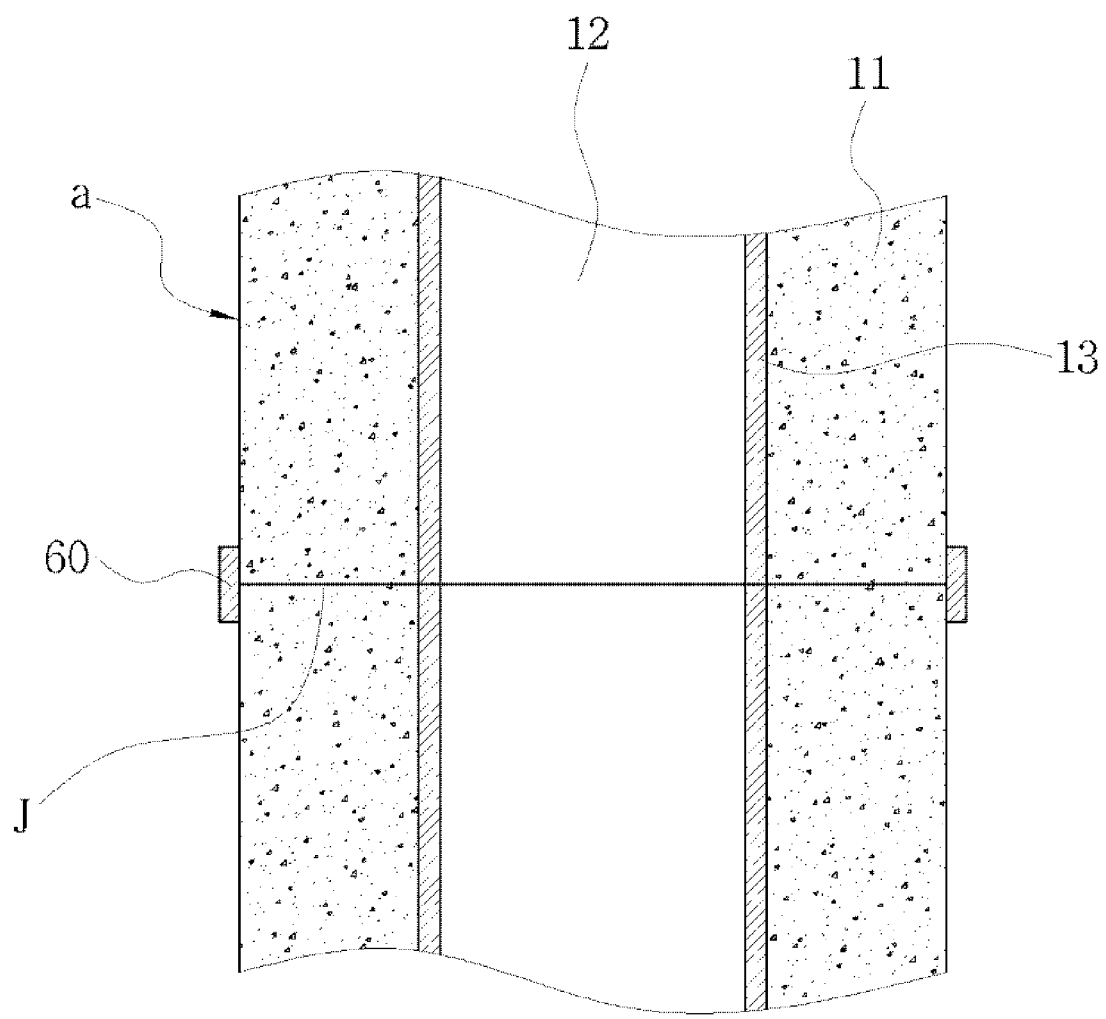
FIG. 8 is a side sectional view illustrating an embodiment of an assembly means of the junction between the modularized units of the main body part according to the present invention.
Figure 10:
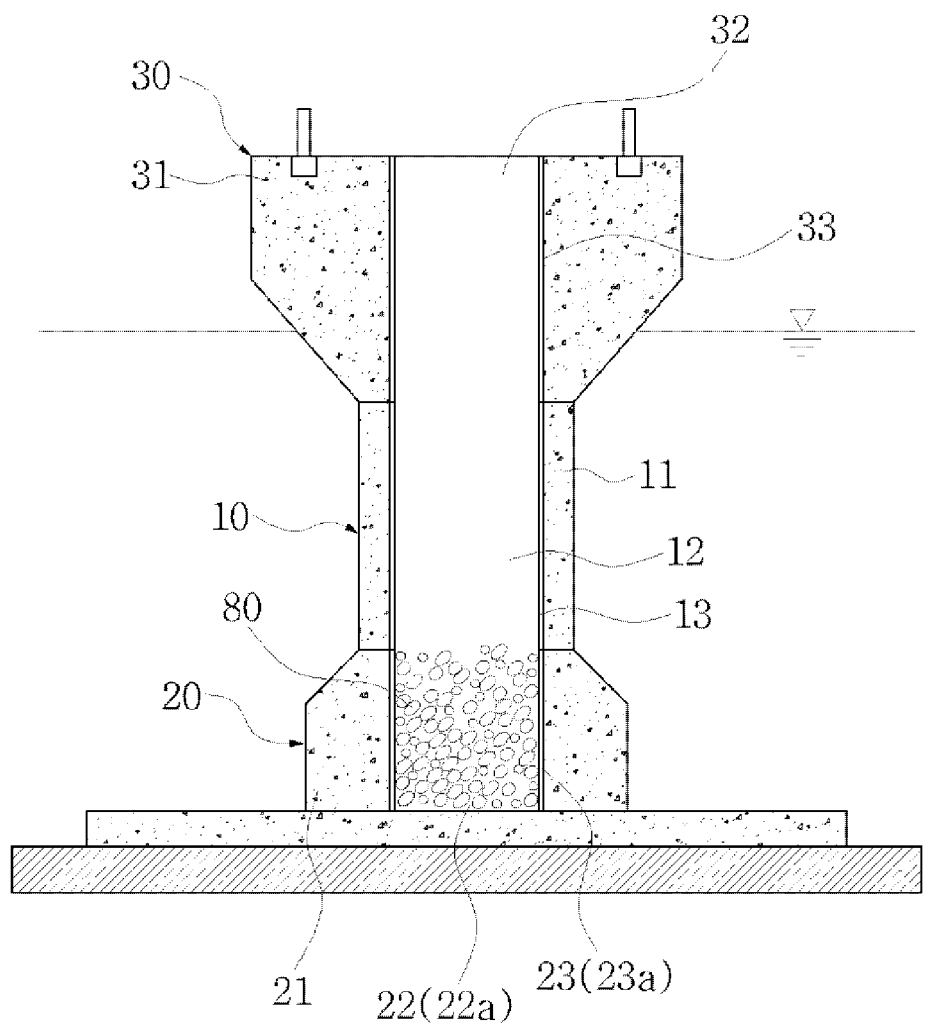
FIG. 10 is a side sectional view illustrating a weight unit which is further provided in the embodiment of FIGS. 3A and 3B.

FIG. 1 is a schematic view illustrating a supporting structure for an offshore wind power generator installed on the sea floor according to the present invention. FIG. 2 is a perspective view illustrating a main body part of the supporting structure according to the present invention. FIGS. 3A and 3B as well as FIGS. 4A and 4B are side sectional views showing embodiments of a lower support part of the supporting structure according to the present invention. FIGS. 5A through 5C, FIGS. 6A through 6C, and FIGS. 7A thorough 7C are perspective views illustrating embodiments of a shear key and a shear key depression of modularized units of the main body part of the supporting structure according to the present invention. FIG. 8 and FIGS. 9A and 9B are side sectional views illustrating embodiments of assembly means of the junction between the modularized units of the main body part according to the present invention. FIG. 10 is a side sectional view illustrating a weight unit which is further provided in the embodiment of FIGS. 3A and 3B.

As shown in FIG. 1, the supporting structure for an offshore wind power generator according to the present invention includes a lower support part 20, a main body part 10 and an upper support part 30. The lower support part 20 is constructed on a base 4 which is installed on a sea floor 3. The upper support part 30 supports a tower 1 and an impeller 2 provided on an upper end of the tower 1. As will be explained later herein, each of the lower support part 20, the main body part 10 and the upper support part 30 has a hollow space therein so as to reduce its own weight, thus facilitating the assembly and construction of the supporting structure. The hollow space is confined by the inner pipe so that the bending strength can be enhanced and, particularly, resistance to a transverse load can be markedly increased, whereby the supporting structure can reliably support the tower 1 or the like in the sea.

That is, as shown in FIG. 2 illustrating one example of the main body part 10, a main-body inner-pipe 13 is installed on an inner surface of a main-body hollow space 12 formed in a main-body concrete part 11, thus supporting the main-body concrete part 11, whereby the main-body concrete part 11 can be under a triaxial compression load. In this way, the weight of the main-body concrete part 11 can be reduced by forming the main-body hollow space 12 therein, thus facilitating the construction of the supporting structure, and preventing brittle fracture which may incidentally occur on the cross-section of the main-body concrete part 11 having the main-body hollow space 12 therein. Furthermore, the main-body inner-pipe 13 increases both the rigidity with respect to bending moment and resistance to transverse load such as wave load which occurs in or on the sea. Although the main-body concrete part 11 has been illustrated in FIG. 2 as having a hexahedral shape, the shape of the main-body concrete part 11 is not limited to this shape. Preferably, longitudinal reinforcing bars 14 and lateral reinforcing bars 15 are arranged in the main-body concrete part 11 so as to increase the resistance to bending. In FIG. 2, although the main body part 10 has been illustrated as an example, each of the lower and upper support parts 20 and 30 also has a hollow space 22, 32 and an inner pipe 23, 33 in the same manner as that of the main body part 10 and the functions of them are also the same as those of the main body part 10.

As shown in FIGS. 3A and 3B and FIGS. 4A and 4B, the lower support part 20 is placed on the base 4 of the sea bottom 3 and includes a lower concrete part 21 which is reduced in width from the bottom to the top, at least one lower hollow space 22 which is formed in the lower concrete part 21, and a lower inner-pipe 23 which is attached to a circumferential inner surface of the lower hollow space 22 and is formed steel or FRP (fiber reinforced plastic). It is preferable that a longitudinal reinforcing bar and a lateral reinforcing bar be arranged in the lower support part 20, although it is not illustrated in the drawings.

The lower inner-pipe 23 may be made of steel to have rigidity sufficiently capable of resisting bending moment. As necessary, the lower inner-pipe 23 may be made of FRP that has corrosion resistance and sufficient ductility to enhance resistance to a caustic spray environment. More preferably, reinforcement material is added to the FRP to form CFRP (carbon), AFRP (aramid), GFRP (glass), etc., and they can be selectively used depending on construction conditions of a site. Furthermore, by virtue of the additional use of FRP or the like, the weight of the structure can be reduced, whereby the construction of the supporting structure can be facilitated.

Meanwhile, the lower hollow space 22 is formed through the lower concrete part 21. The lower hollow space 22a according to an embodiment of FIG. 3A and FIG. 3B has a cylindrical shape, and the lower inner-pipe 23a also has a cylindrical pipe shape.

The lower hollow space 22b according to an embodiment of FIG. 4A and FIG. 4B has a shape in which the diameter thereof is reduced from the bottom to the top, and the lower inner-pipe 23b is also configured such that the diameter thereof is reduced from the bottom to the top. In this embodiment, because the lower hollow space 22b and the lower inner-pipe 23b have these structures, the amount of material required to form the lower concrete part 22 and the weight thereof can be reduced regardless of terms of rigidity and ductility. Therefore, there are advantages in terms of construction and economical efficiency. However, in term of the shape, the lower inner-pipe 23a shown in FIGS. 3A and 3B could be more easily formed than the lower inner-pipe 23b. Therefore, it is preferable that the shape of the lower support part 20 be selectively determined as necessary.

The main body part 10 is coupled to the upper end of the lower support part 20. The main body part 10 includes the main-body concrete part 11, at least one main-body hollow space 12 which is formed in the main-body concrete part 11, and the main-body inner-pipe 13 which is made of steel or FRP and is provided on the inner surface of the main-body hollow space 12 to confine the main-body hollow space 12 therein. The main body part 10 functions to transmit the load of the tower 1 and the impeller 2 to the lower support part 20.

The upper support part 30 is provided on the upper end of the main body part 10. The upper support part 30 includes an upper concrete part 31 which is increased in width from the bottom to the top, at least one upper hollow space 32 which is formed in the upper concrete part 31, and an upper inner-pipe 33 which is attached to a circumferential inner surface of the upper hollow space 32 and is made of steel or FRP. As shown in FIG. 1, the upper support part 30 functions to support the tower 1 and the impeller 2 thereon and transmit the load of the tower 1 and the impeller 2 to the main body part 10.

Particularly, it is preferable that junctions among the lower inner-pipe 23, the main-body inner-pipe 13 and the upper inner-pipe 33 be soft. The reason for this is because the above components can more reliably conduct the function of transmission of the load, the assembly among the components can be facilitated, and the supporting structure which is formed by the assembly of the lower inner-pipe 23, the main-body inner-pipe 13 and the upper inner-pipe 33 can be integrated in such a way that the components are interlocked with each other. For this, preferably, the lower hollow space 22, the main-body hollow space 12 and the upper hollow space 32 have the same diameter at the junctions among them.

As shown in FIGS. 5A through 9B, the supporting structure for an offshore wind power generator according to the present invention may be configured in such a way that the main body part 10 is unitized into upper and lower units a which can be separably assembled with each other. In the present invention, five embodiments are introduced with regard to the structure for coupling the units a to each other. Each unit a includes the main-body concrete part 11, the main-body inner-pipe 12 and the main-body hollow space 13. Of course, depending on the entire structure of the main body part 10, the size of each unit a can be changed. For instance, if the main body part 10 is configured such that the width thereof is reduced from the bottom to the top, the width of an upper surface of an upper end unit a is smaller than that of an upper surface of a lower end unit a.

As shown in FIGS. 5A through 7C, first through third embodiments are determined according to the structure of a shear key 40 and a shear key depression 50 which are formed in the units a.

As shown in FIGS. 5A through 5C, in the first embodiment, a shear key 40a and a shear key depression 50a are provided in corresponding ends of the main-body concrete parts 11 of the units a that face each other. The shear key 40a has a protrusion shape and comprises a plurality of shear keys 40a. The shear key depression 50a comprises a plurality of shear key depressions 50a which correspond to the respective shear keys 40a. Facing each other, the shear keys 40a and the shear key depression 50a are provided in the main-body concrete parts 11 of the upper and lower units a so that the upper and lower units a can be assembled with each other in an insert coupling manner. In this case, different kinds of methods can be used to fasten the shear keys 40a and the shear key depressions 50a to each other and, for example, mortar may be used.

Preferably, the number of shear keys 40a and the number of shear key depressions 50a are changed in response to bending moment applied to a junction J between the units a.

FIGS. 6A through 6C illustrate the second embodiment of the present invention. In the second embodiment, in the same manner as the first embodiment of FIGS. 5A through 5C, a shear key 40b and a shear key depression 50b are provided in corresponding ends of the main-body concrete parts 11 of the units a that face each other. The shear key 40b has an annular protrusion shape. The shear key depression 50b has an annular shape corresponding to that of the shear key 40b. In the same manner, the shear key 40b and the shear key depression 50b which face each other are provided in the main-body concrete parts 11 of the upper and lower units a so that the upper and lower units a can be assembled with each other in an insert coupling manner. Also, different kinds of methods can be used to fasten the shear key 40b and the shear key depression 50b to each other and, preferably, mortar may be used.

FIGS. 7A through 7C illustrate the third embodiment of the present invention. In this embodiment, a shear key 40c and a shear key depression 50c are provided in corresponding ends of the main-body concrete parts 11 of the units a, wherein the shear key 40c comprises a plurality of shear keys 40c each of which has a bar shape that protrudes from the main-body concrete part 11, and the shear key depression 50c comprises a plurality of shear key depressions 50c which are configured corresponding to the respective shear keys 40c so that the bar-shaped shear keys 40c are inserted into the respective shear key depressions 50c. In other words, each shear key 40c is a bar that is made of steel or the like and is inserted into or attached to an end of the main-body concrete part 11. An attaching end made of steel may be formed by the shear key 40c in the end of the main-body concrete part 11, although it is not designated by a reference numeral. In this case, each shear key depression 50c is formed by forming a depression in a corresponding end of the main-body concrete part 11 of the adjacent unit so that the shear key 40c can be inserted into the depression, wherein the depression may be formed in such a way that an attaching end (not designated by reference numeral) which is made of steel or the like unlike the main-body concrete part 11 and has a through hole therein is provided in the end of the main-body concrete part 11. In the same manner, the shear keys 40c and the shear key depressions 50c which face each other are provided in the main-body concrete parts 11 of the upper and lower units a so that the upper and lower units a can be assembled with each other in an insert coupling manner. Also, different kinds of methods can be used to fasten the shear keys 40c and the shear key depressions 50c to each other and, preferably, mortar may be used. In this embodiment, the attaching ends may be attached to the corresponding main-body concrete part 11 by welding.

FIG. 8 illustrates the fourth embodiment of the present invention. In this embodiment, a support 60 that has a plate shape is attached to a circumference of the junction J between the upper and lower units a so that the upper and lower units a can be coupled to each other. In detail, it is preferable that the plate-shaped support 60 be attached to the circumference of the junction J between the units a so as to prevent the junction J between the units from becoming brittle.

The support 50 is attached to the junction J between the units a and is preferably made of FRP because it must have corrosion resistance. A known technique, for example, using adhesive, can be used to attached the support 50 to the junction J between the units a and, therefore, further explanation thereof will be omitted.

FIGS. 9A and 9B illustrate another embodiment. In this embodiment, a connector 70 that has an H-shaped cross-section is provided in the junction J between the upper and lower units a so as to fasten the upper and lower units a to each other. In detail, the connector 70 has an H-shaped cross-section, wherein an upper insert depression 71 is formed in an upper surface of the connector 70 so that a lower end of the upper unit a can be inserted into the connector 70, and a lower insert depression 72 is formed in a lower surface of the connector 70 so that an upper end of the lower unit a can be inserted into the connector 70. Because the upper and lower units a are inserted into the connector 70, the main-body concrete parts 11 of the upper and lower units a are supported by an outer support rim 73 at the junction J between the units a, and the main-body inner-pipes 13 of the upper and lower units a are supported by an inner support rim 74.

The connector 70 can be attached to the units a at the junction J therebetween by a known technique, e.g., welding or using adhesive. By virtue of this attachment structure, the junction J between the units a can be prevented from becoming brittle.

As shown in FIG. 10, the lower support part 20 may be configured such that a weight unit 80 is provided in the lower hollow space 22. The weight unit 80 comprises gravel and crushed stones which are charged into the lower hollow space 22 so that the lower support part 20 can be prevented from slipping because of a transverse load.

The lower concrete part 21 and the main-body concrete part 22 of the lower support part 20 and the main body part 10 which are disposed in sea are preferably made of concrete that can be prevented from being discomposed in the water.

For this, each of the lower concrete part 21 and the main-body concrete part 22 is formed by pre-casting or casting in a site using a composite containing cement, furnace slag, fine aggregate, coarse aggregate and admixture. With regard to the mix proportion, preferably, cement ranges from 400 kg/m$^3$ to 450 kg/m$^3$, furnace slag ranges from 100 kg/m$^3$ to 350 kg/m$^3$, mixing water ranges from 180 kg/m$^3$ to 230 kg/m$^3$, fine aggregate ranges from 600 kg/m$^3$ to 700 kg/m$^3$, coarse aggregate ranges from 800 kg/m$^3$ to 900 kg/m$^3$ and admixture ranges from 4 kg/m$^3$ to 8 kg/m$^3$.

In the mix, the reason why furnace slag is used as bonding agent is because the degree of fineness of furnace slag is comparatively high, it has a spherical shape so that the mobility can be ensured, and the specific surface area is large so that the viscosity can be appropriately maintained and thereby separation of substances constituting the part can be prevented. The reason why the mix proportion of furnace slag is limited, as stated above, is because of the fact that if it is less than the limited range, there is no contribution of furnace slag in terms of fluidity and viscosity, and if it exceeds the limited range, the viscosity is rather reduced so that suspension is excessively formed, and the strength is also reduced.

Particularly, admixture is a mixture of a cellulose-based viscosity agent, an acryl-based viscosity agent, a polyethyleneoxide-based viscosity agent and propylene carbonate. Such admixture provides sufficient viscosity to concrete so as not only to enhance resistance to the underwater-separation of substances constituting the concrete part but also to provide fluidity to a concrete composite.

Considering cost efficiency, a cellulose-based viscosity agent is used as main material of the admixture while an acryl-based viscosity agent is used as an auxiliary material. The reason for this is the fact that when furnace slag is used as a bonding agent, the cellulose-based viscosity agent holds cement particles but is not able to hold furnace slag which increases suspension material, and the acryl-based viscosity agent can hold furnace slag to restrict generation of suspension material. The reason why a polyethyleneoxide-based viscosity agent is added to the admixture is to prevent fluidity of the concrete composite from deteriorating because of the acryl-based viscosity agent being added to the admixture to restrict generation of suspension.

Propylene carbonate which is added to the admixture functions to make the admixture be evenly dispersed in the concrete composite, thus preventing the concrete composite from being ununiform because of viscosity agent being weighted to one side.

It is preferable in terms of viscosity and fluidity that the admixture comprises, with respect to 100 weight parts of cellulose-based viscosity agent, 3 to 7 weight parts of acryl-based viscosity agent, 2 to 5 weight parts of polyethyleneoxide-based viscosity agent, and 2 to 4 weight parts of propylene carbonate.

The present invention having the above-mentioned construction has the following effects.

First, the present invention provides a supporting structure, in which a tri-axial compression load state can be formed in such a way that a concrete part is supported by an inner pipe, thus enhancing rigidity with respect to bending moment, and resistance to a transverse load.

Second, the weight of the supporting structure of the present invention can be reduced by formation of a hollow space, thus reducing the material cost. Further, the supporting structure can be modularized so that the assembly and construction thereof can be facilitated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A supporting structure for an offshore wind power generator, comprising:
    a lower support part comprising: a lower concrete part provided on a base installed on a sea floor, the lower concrete part being reduced in width from a bottom thereto to a top; at least one lower hollow space formed in the lower concrete part; and a lower inner-pipe attached to a circumferential inner surface of the lower hollow space, the lower inner-pipe being made of steel or FRP (fiber reinforced plastic); and
    a main body part coupled to an upper end of the lower support part, the main body part comprising: a main-body concrete part; at least one main-body hollow space formed in the main-body concrete part, the main-body hollow space communicating with the lower hollow space; and a main-body inner-pipe attached to a circumferential inner surface of the main-body hollow space, the main-body inner-pipe being made of steel or FRP
    wherein the main body part comprises a plurality of units assembled with each other with respect to a vertical direction, wherein a shear key and a shear key depression are respectively provided in upper and lower ends of the main-body concrete part of each of the units so that the adjacent upper and lower units are assembled with each other.

2. The supporting structure as set forth in claim 1, further comprising
    an upper support part comprising: an upper concrete part provided on an upper end of the main body part, the upper concrete part being increased in width from a bottom thereto to a top; at least one upper hollow space formed in the upper concrete part, the upper hollow space communicating with the main-body hollow space; and an upper inner-pipe attached to a circumferential inner surface of the upper hollow space, the upper inner-pipe being made of steel or FRP.

3. The supporting structure as set forth in claim 1, wherein each of the lower hollow space and the lower inner-pipe has a cylindrical shape.

4. The supporting structure as set forth in claim 1, wherein each of the lower hollow space and the lower inner-pipe is reduced in diameter from a bottom thereof to a top.

5. The supporting structure as set forth in claim 1, wherein a support having a planar shape is attached to a circumferential outer surface of a junction between the adjacent upper and lower units so that the upper and lower units are assembled with each other.

6. The supporting structure as set forth in claim 1, wherein a connector having an H-shaped cross-section is provided in a junction between the adjacent upper and lower units so that the adjacent upper and lower units are assembled with each other.

7. The supporting structure as set forth in claim 1, further comprising
    a weight unit charged into the lower hollow space, the weight unit comprising gravel or crushed stone.

8. The supporting structure as set forth in claim 1, wherein each of the lower concrete part and the main-body concrete part contains cement, furnace slag, fine aggregate, coarse aggregate and admixture, wherein the cement ranging from 400 kg/m$^3$ to 450 kg/m$^3$, the furnace slag ranging from 100 kg/m$^3$ to 350 kg/m$^3$, mixing water ranging from 180 kg/m$^3$ to 230 kg/m$^3$, the fine aggregate ranging from 600 kg/m$^3$ to 700 kg/m$^3$, the coarse aggregate ranging from 800 kg/m$^3$ to 900 kg/m$^3$ and the admixture ranging from 4 kg/m$^3$ to 8 kg/m$^3$ are mixed with each other, and the admixture comprises a mixture of a cellulose-based viscosity agent, an acryl-based viscosity agent, a polyethyleneoxide-based viscosity agent and propylene carbonate.

\* \* \* \* \*